United States Patent [19]

Hakanen

[11] Patent Number: 4,957,264

[45] Date of Patent: Sep. 18, 1990

[54] MOUNTING BASE FOR A TELEPHONE DEVICE, SUCH AS A MOBILE TELEPHONE

[75] Inventor: Pekka Hakanen, Turku, Finland

[73] Assignee: Nokia-Mobira Oy

[21] Appl. No.: 308,246

[22] Filed: Feb. 8, 1989

[51] Int. Cl.$^5$ ............................................. F16M 97/00
[52] U.S. Cl. ..................................... 248/510; 312/7.1
[58] Field of Search ...................... 312/7.1; 248/221.4, 248/220.2, 510

[56] References Cited

U.S. PATENT DOCUMENTS

| | | | |
|---|---|---|---|
| 3,809,799 | 5/1974 | Taylor | 248/221.4 X |
| 3,827,772 | 8/1974 | Johnson | 312/7.1 |
| 3,931,946 | 1/1976 | Soltysik | 248/221.4 X |
| 4,714,303 | 12/1987 | Suzuki et al. | 312/7.1 |

*Primary Examiner*—Joseph Falk

[57] ABSTRACT

Mounting base for the transceiver of a mobile telephone for use in vehicles, the transceiver having a rigid box-like enclosure. The mounting base (10) comprises a baseboard (12) having a main surface (20) and at least four sides (21, 22, 23, 24), at least three resilient brackets (14, 14', 14'') extending from the sides of the baseboard. The brackets (14, 14', 14'') have clips (16, 16', 16'') at their free ends pointing inwardly over the baseboard. For mounting, the transceiver enclosure (110) is placed against the brackets and the transceiver bottom plate (112) against the baseboard (12) so that the bracket clips tightly snap on the transceiver upper edges. Pins (30) and recesses (40) cooperate with corresponding recesses and supports in the enclosure preventing the transceiver enclosure form moving relative the baseboard. The mounting base (10) is well suited for automatic production.

6 Claims, 2 Drawing Sheets

MOUNTING BASE FOR A TELEPHONE DEVICE, SUCH AS A MOBILE TELEPHONE

BACKGROUND OF THE INVENTION

1. Field of the invention

This invention relates to a mounting base for mounting telecommunications equipment in a vehicle or in a vessel, and more specifically to a mounting base for the transceiver of a mobile telephone, the transceiver having a rigid box-like enclosure.

2. Description of the prior art

Usually telecommunications equipment, e.g. mobile telephones, are installed in vehicles or vessels with the aid of a mounting base. The conventional mounting base comprises a frame made of several parts of metal sheet. The parts are manufactured in a process including several phases, assembled to a frame and then a plurality of different accessories, such as mounting rails, shock absorbers and locking devices, are added. The manufacturing is expensive. The conventional mounting bases present good mechanical stability, but require ample installation space.

SUMMARY OF THE INVENTION

It is an object of the present invention to provide an improved mounting base, which is inexpensive and simple to manufacture.

According to the invention there is provided a mounting base construction comprising a baseboard having a main surface and at least four sides, at least three resilient brackets extending from three sides of the baseboard and substantially perpendicular to the main surface of the baseboard, the brackets having clips at their free ends pointing inwardly over the baseboard, a retainer extending from the baseboard above the main surface at the fourth side, whereby, for mounting, three sides of the transceiver are placed against the brackets with the transceiver bottom plate against the baseboard so that the bracket clips tightly snap on the transceiver upper edges and the retainer abuts the edge on the fourth side of the transceiver.

The rigidity of the construction according to the invention is enhanced by pins and recesses in the baseboard cooperating with corresponding recesses and projections in the transceiver bottom plate.

According to the invention the mounting base is preferably made of resilient injection molded plastic. The rigid transceiver will then support the mounting base. According to the invention the resilient mounting base itself provides suitable vibration suppression or shock absorbing properties against vehicular vibrations.

BRIEF DESCRIPTION OF THE DRAWINGS

The invention is further described by way of example with reference to the accompanying drawing, in which.

DETAILED DESCRIPTION OF THE PREFERRED EMBODIMENT

Figure 1:
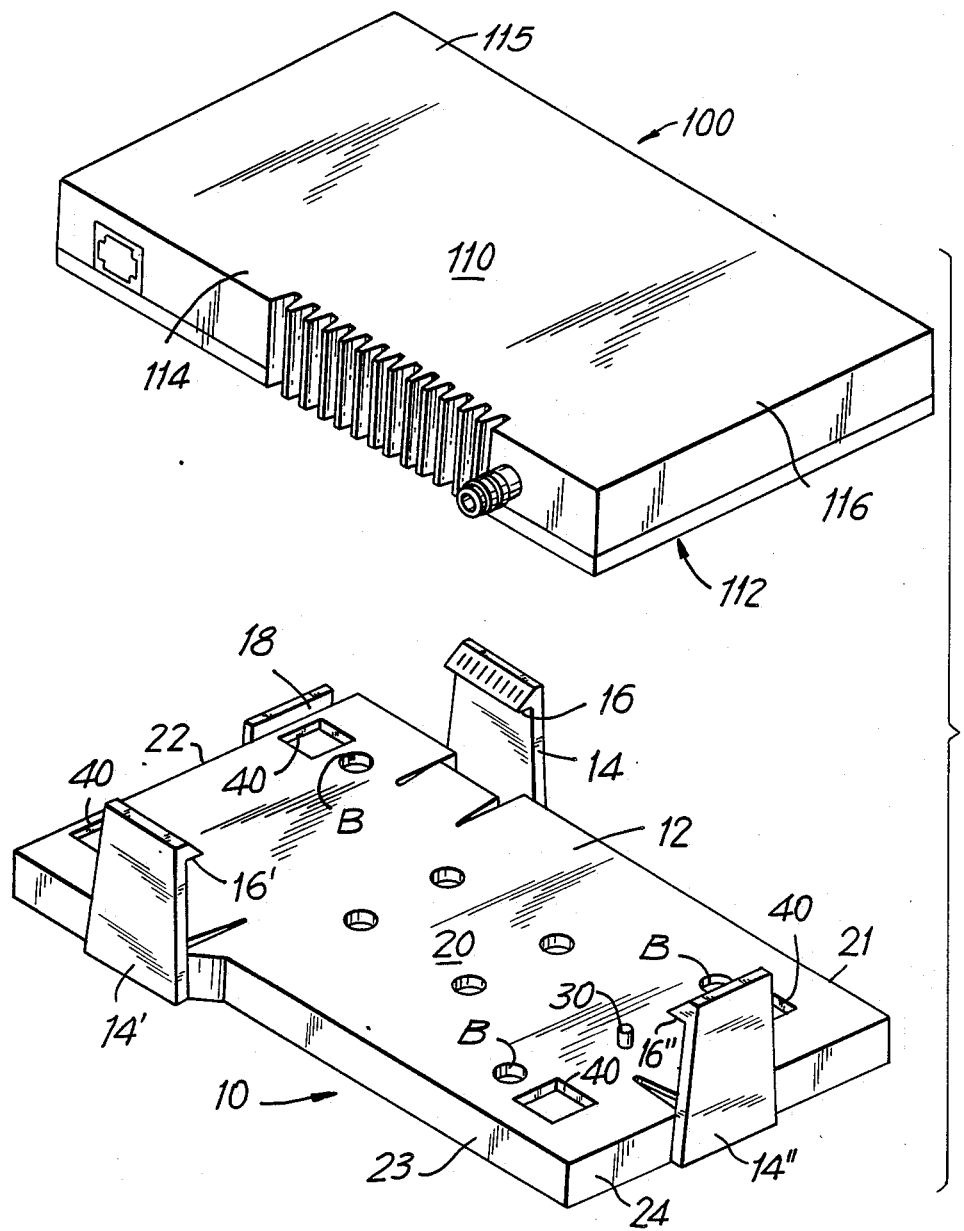
FIG. 1 schematically illustrates a mounting base and a transceiver in perspective view.

The accompanying drawing illustrates a transceiver 100 and a mounting base 10 for it.

The transceiver 100 is known per se, and it comprises the central unit in a mobile radio-telephone equipment, which in this example is a "mobile only"-transceiver unit TMX-1 made by Nokia-Mobira Oy, Salo, Finland, intended for vehicles or vessels. The transceiver is often installed below the dashboard or in the trunk of a car or in a similar place, where power and antenna cables and extension cables for the handset and other accessories may easily be connected (connecting cables not shown). The transceiver has a box-like enclosure 110 of die-cast aluminum, which is mechanically rigid.

The mounting base 10 according to the invention, which includes a baseboard 12, brackets 14, 14' and 14" with clips 16, 16' and 16" respectively. The brackets are situated on three sides 21, 23, 24 of the baseboard and substantially perpendicular to the main surface 20 of the baseboard. On the fourth side 22 of the baseboard is a retainer 18. The distance between the brackets 14 and 14' correspond to the width of the transceiver 100, the distance between the bracket 14" and retainer 18 corresponding to the length of the transceiver.

Figure 2:
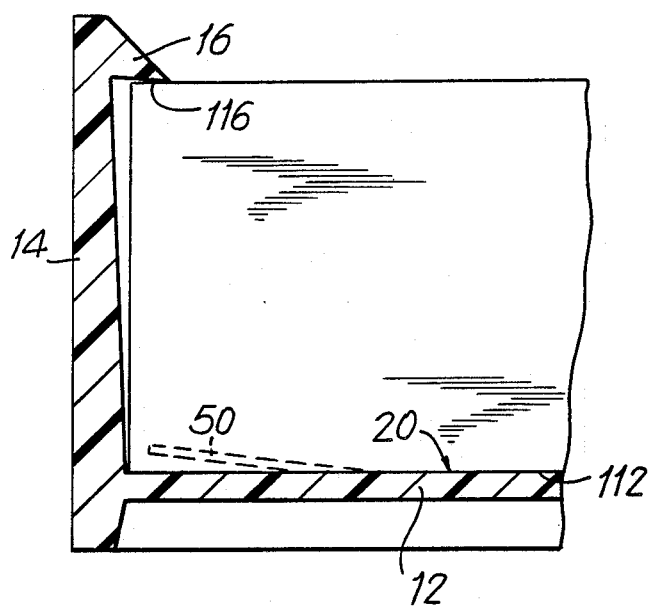
FIG. 2 is a cross-section of a bracket with a clip snapped on the transceiver.

The brackets have at their free ends clips 16, 16' and 16" that extend inwardly over the baseboard 12. As can be seen in FIG. 2, the distance from the tip of a clip 16, 16' or 16" to the baseboard main surface 20 corresponds to the height of the transceiver enclosure 110.

The mounting base 12 is made of resilient injection molded plastic in one integral piece comprising the brackets 14, 14' and 14" and the retainer 18. The design is well suited for automatic production.

The mounting base 10 is fastened to a suitably even surface by e.g. screws (not shown) through bores B (of which three are shown in FIG. 1). The number of bores may vary according to installation requirements, but 3 to 6 is considered suitable.

The mounting base may be installed with the baseboard downwards or upright, with the retainer 18 preferably at the lowest side. The mounting base 10 requires considerably less installation space in comparison with prior art mounting bases.

The transceiver is inserted in the mounting base for example by pushing it against the clips 16, 16' and 16" on the brackets 14, 14' and 14" from above, as in FIG. 1. For this purpose the clips 16, 16' and 16" have an upper surface, which is bevelled inwards to the baseboard, whereby the brackets will bend outwards so that the enclosure can pass the clips. Three sides of the transceiver enclosure 110 are placed against the brackets with the transceiver bottom plate 112 against the baseboard 12 so that the bracket clips 16, 16' and 16" tightly snap on the transceiver upper edges 114, 115 and 116 respectively and the retainer 18 abuts the edge on the fourth side 22 of the transceiver. In FIG. 2 the bracket 14 and the enclosure 110 show a distance between them only for the purpose of illustration, whereas in practice there should be no substantial clearance. There is also schematically shown a tongue 50 in a position before the mounting of the transceiver, the tongue 50 acting as a spring to push the enclosure 110 upwards so as to facilitate demounting of the transceiver upon releasing the bracket clips one-by-one. The other brackets 14' and 14" are constructed in the same manner as shown for bracket 14 in FIG. 2.

The tongues 50 also assist, e.g. together with resilient foots at the bottom side of the tranceiver enclosure 110, in holding the enclosure tightly against the bracket clips 16, 16', 16".

In order to prevent the mounted transceiver enclosure 110 to move relative the baseboard 12, there are provided one or more short pins 30 extending upwardly from the baseboard 12 into corresponding recesses (not shown) in the transceiver bottom plate 112. There are also four recesses 40 in the baseboard in order to receive corresponding supports on the bottom plate.

The rigid transceiver enclosure 110 will mechanically strengthen the installation in the resilient mounting base 10. On the other hand, the resilient material of the mounting base 10 will act as a shock absorbing device or vibration suppressor, thereby protecting the transceiver 100 against shocks and vibrations caused by the vehicle.

No separate shock absorbers are necessary.

The mounting base according to the invention consists of one piece, is simple to manufacture and install, and therefore inexpensive.

Applications of the principles of the invention in this and similar manners are all intended to fall within the scope of the invention.

What is claimed is:

1. Mounting base for a telephone device, particularly the transceiver of a mobile telephone, the transceiver having a rigid box-like enclosure, wherein the mounting base comprises a baseboard having a main surface and at least three resilient brackets extending from three sides of the baseboard and substantially perpendicular to the main surface of the baseboard, the brackets having clips at their free ends pointing inwardly over the baseboard, said brackets having a length between said main surface and said clips corresponding to thickness of said telephone device, a retainer extending from the baseboard above the main surface at the fourth side, for mounting, three sides of the transceiver enclosure are placed against the brackets with the transceiver bottom plate against the baseboard so, the bracket clips tightly snapping over the transceiver upper edges and the retainer abutting the edge on the fourth side of the transceiver.

2. Mounting base according to claim 1, wherein the mounting base further comprises at least one pin extending upwardly from the baseboard into a corresponding recess in the transceiver bottom plate in order to prevent the transceiver enclosure from moving relative the baseboard.

3. Mounting base according to claim 1 or 2, wherein the mounting base, the brackets with clips and the retainer are injection molded of plastic to form one piece, which is stabilized by the rigid transceiver enclosure firmly held between the clips and the baseboard.

4. Mounting base according to any one of claims 1-3, wherein the resilient brackets permit the transceiver enclosure to be inserted between them from above, in a direction perpendicular to the baseboard whereby the brackets will bend so that the enclosure can pass the clips, and that the mounted enclosure can be removed by simultaneously bending the brackets away from the enclosure to permit the enclosure to be lifted out.

5. Mounting base according to any one of claims 1-4, wherein it further comprises at least three bores for fastening screws, with which the mounting base can be fastened to a vehicle.

6. Mounting base according to claim 5, wherein the resilient mounting base itself provides a vibration suppression for the transceiver against vehicular vibrations.

* * * * *